3,530,081
PROCESS FOR GROUTING EMPLOYING AN IRON-HYDROXIDE POLYOL SETTING AGENT
Franklin W. Herrick, Lloyd E. Van Blaricom, and Robert L. Strachila, Shelton, Wash., and George E. Durkee, Pleasantville, N.Y., assignors to ITT Rayonier Incorporated, Shelton, Wash., a corporation of Delaware
No Drawing. Filed Mar. 13, 1969, Ser. No. 807,118
Int. Cl. C08g 20/08; E04d 7/00; E04g 23/02
U.S. Cl. 260—17.2                                                                6 Claims

ABSTRACT OF THE DISCLOSURE

An alkaline aqueous gel-forming grouting composition comprising a vegetative polyphenolic material, formaldehyde and an iron hydroxide-polyol complex is injected into earth, sand, gravel and other porous formations of particulate solids to produce a grouted structure of improved strength and stability. The grouting composition has improved penetration properties and a readily predictable "in situ" gel time. The inclusion of clay in the grouting composition has been found to be particularly advantageous.

BACKGROUND OF THE INVENTION

Chemical grouting is a technique for treating earth, sand, gravel and other porous formations of particulate solids with a liquid agent that solidifies to a gel and acts to seal and reinforce said formations. Control over the properties of the grouting agent, both in the liquid and the gel form, is important in order that said grouting agent can be properly placed in the formation to gel in a predictable time interval and yield a grouted structure having a predictable strength and durability. Application of chemical grouts is normally made by use of a two-pump, one-shot system wherein two liquid components comprising a reactive structural material for gel formation and a solution of a setting agent are brought together and mixed just prior to injection into the porous particulate formation that is being grouted. It is essential that the two liquid components be compatible so that mixing yields a completely homogenous liquid grout.

The grouting systems described in the Herrick et al. U.S. Pat. No. 3,391,542, are based on the use of water-soluble polyphenolic materials extracted from vegetative sources such as tree barks and wood. In the grouting process these polyphenolic materials are dissolved in water and combined with formaldehyde and certain water-soluble heavy metal salts, which, after a predictable short period of time, are converted into higher molecular weight gel complexes that are substantially insoluble in water even though water is retained in the gel structures.

SUMMARY OF THE INVENTION

It has now been found that when a water-soluble iron salt is used in the grouting process described in U.S. Pat. No. 3,391,542, and when the iron salt prior to its use therein is first reacted in aqueous solution with a polyol compound (as hereinafter defined), to form an iron hydroxide-polyol complex, the resulting grouted structure will have an unexpectedly higher strength than that achieved by the above-mentioned process. Moreover, the conversion of the iron salt into the iron hydroxide-polyol complex results in a grouting composition having improved penetration properties and a more readily predictable gel time. The inclusion of clay in the grouting composition has been found to be particularly advantageous. The reason for the surprisingly enhanced results are not entirely understood.

DETAILED DESCRIPTION

The grouting composition used according to the present invention is an alkaline aqqueous gel-forming composition comprising an admixture of (a) a vegetative poylphenolic material of the group consisting of aqueous alkaline extracts of coniferous tree barks, catechin and condensed tannins and mixtures of the two, (b) from about 1 to 10 weight percent of formaldehyde based on the dry weight of the polyphenolic material and (c) an iron hydroxide-polyol complex as hereinafter described. Clay can also be included. Generally the ratio of polyphenolic material to clay can be 1:5 to 5:1 by weight.

In our invention, the polyphenolic material to be useful must be substantially soluble in alkaline aqueous solutions at ambient temperatures, have a formaldehyde reactivity of at least 5 as hereinafter defined and be capable of rapid controllable gelation. Suitable bark polyphenolics are obtained by the extraction of the bark of western hemlock, Douglas fir, white fir, Sitka spruce and southern yellow pine (*Pinus echinata, taeda, caribea, elliotti* and *rigida* var. *serotina*) trees with aqueous solutions of sodium, ammonium and potassium hydroxides at temperatures ranging from ambient to about 185° C. for from about 240 to 15 minutes. Particularly useful polyphenolic materials can be prepared from the foregoing barks by the methods of U.S. Pat. No. 2,782,241 to Gray and Crosby issued Feb. 19, 1957, U.S. Pat. No. 2,819,295 to Steinberg and Gray issued Jan. 7, 1958 and U.S. Pat. No. 2,823,223 issued Feb. 11, 1958.

When the polyphenolic material is a vegetable tannin, only the catechin and condensed tannins such as those obtained from quebracho, mangrove, mimosa, wattle and eucalyptus woods and barks are usable. Gallo hydrolyzable tannins such as those extracted from chestnut, myrobalan and divi-divi are not as they cannot be gelled satisfactorily under grouting conditions.

Finally we have found that mixtures of bark polyphenolics and the vegetable tannins are particularly useful and for many applications are to be preferred.

As previously indicated the utility of the polyphenolic materials in the invention, regardless of origin, is based on a combination of the formaldehyde reactivity, the rate of gelation, the gel time and strength and the solubility in alkaline solutions. The rate of gelation and gel time for such materials depends upon the chemical constitution and is related to the formaldehyde reactivity which can be determined by the following test.

In a 500 ml. beaker, an accurately weighed sample (about 20 g.) of the polyphenolic material and approximately 300 ml. of water are well mixed. The pH of the solution is adjusted to 9.5 by adding dropwise 5–10% sodium hydroxide or hydrochloric acid as required. The solution is then washed into a 500 ml. volumetric flask and 25 ml. of 37 percent formaldehyde is added. Water is then added to make 500 ml.

A blank determination is made by adding 25 ml. of 37 percent formaldehyde to a 500 ml. volumetric flask and diluting to volumn with water. Five ml. of this solution is added to 50 ml. of water and 10 ml. of 10 percent sodium sulfite solution. This solution is titrated to pH 9.5 with 0.1 N hydrochloric acid. To this solution is added 10 ml. of 10 percent sodium sulfite solution and it is then titrated with 0.1 N hydrochloric acid to pH 9.5. From this value is calculated the amount of formaldehyde remaining after four hours.

The formaldehyde which has condensed with the polyphenolic material is determined by subtracting the formaldehyde found in the four hour sample from that found in the blank. This is expressed as grams of formaldehyde per 100 g. of dry, ash-free polyphenolic material.

The foregoing method of determining formaldehyde was described by Lemme, Chem. Ztg. 27, 896 (1903).

The following table lists some representative formaldehyde reactivities for alkaline bark extracts obtained by the methods described in the aforementioned U.S. Pat. No. 2,782,241 (first column) and U.S. Pat. No. 2,819,295 (second column). Suitable tannin materials have similar formaldehyde reactivities.

|  | Formaldehyde reactivities | |
|---|---|---|
|  | NaOH extract | NH₃ extract |
| Bark species: |  |  |
| Western hemlock | 8.4 | 7.4 |
| Douglas fir | 6.4 | 6.6 |
| Sitka spruce | 6.0 | 7.4 |
| White fir | 6.6 | 5.3 |
| Southern yellow pine | 6.0 | 7.5 |

In the practice of the invention, a suitable polyphenolic material is dispersed in sufficient water to form a 5 to 40 percent solution by weight and the pH is adjusted (if necessary) to between 7 and 12 (preferably between 9 and 11) with sodium hydroxide or an equivalent alkali. The amount of alkali needed for this purpose (if any) will vary widely with the polyphenolic material used. Alkaline bark extracts, for example, normally contain residual alkali from their preparation and consequently seldom require additional alkali to put them in the proper pH range. Tannin extracts on the other hand are frequently acidic and will require as much as 20 to 25 percent of their weight in sodium hydroxide before they will dissolve completely and attain the desired pH. Solution temperature should be ambient (preferably between about 15 to 30° C.) but the exact temperature is not critical. If proper adjustments are made somewhat higher temperatures can be used.

In order to attain proper "in situ" gelation of the foregoing alkaline polyphenolic material in a given earth, sand, gravel or other porous particulate formation at a desired place and within a desired time, from 1 to 10 percent formaldehyde on the weight of the polyphenolic material and a carefully controlled amount of the iron hydroxide-polyol complex are added at the time of injection. They can be added as separate aqueous solutions to the solution of polyphenolics or the iron hydroxide-polyol complex can be admixed with the formaldehyde solution ahead of time and the two added simultaneously. In either case, rapid and thorough mixing of the three components, just prior to or during the one-shot injection process, is essential.

In earth-grouting operations, accurate close control of the length of time between mixing of the three components of the grouting solution and the gel time is of vital importance for proper placement in the earthen formation to insure maximum utility. While variations in the concentration of the polyphenolic material and formaldehyde do affect gel time, primarily control of this factor is accomplished by control of the amount of the iron hydroxide-polyol complex that is added. For a given grout solution the more iron hydroxide-polyol complex that is added the shorter the gel time. We have found that gel times can be varied at will from a few minutes to as long as several hours by varying the iron hydroxide-polyol added within the range of about 0.1 to 10 percent based on the iron analysis of the setting agent or calculated from the weight of the water soluble iron salt employed in its formation and based on the dry weight of the polyphenolic material in the grout. (For most operations, the preferred iron content will range from about 0.5 to 3.0 percent.) In addition to increasing the rate of gelation and reducing the gel time we have also found that early gel strengths and grouted structure strengths which are directly related thereto also increase proportionately as the amount of metal ion that is added. Ultimate strengths are not perceptibly affected since ultimate strength depends on the complete reaction with formaldehyde. Excessive amounts of the iron hydroxide-polyol material must, however, be avoided. Excessive iron hydroxide-polyol setting agent not only shortens gel time below useful limits but it also has an adverse effect on the ultimate strengths of the grouted structure. Basically, the same compositions which are disclosed in the U.S. Pat No. 3,391,542 can be used in the present invention except that the water-soluble iron hydroxide-polyol complex is used to replace the water-soluble iron salt therein. As discussed hereinafter, clay can also be advantageously incorporated in the admixture.

In the present invention, the term "polyol" is used synonymously with "polyhydroxy compound." More specifically it is defined as meaning monomeric sugars, low-molecular weight sugar polymers and derivatives thereof such as sugar alcohols, sugar acids, and glycosides and the like. Examples of suitable polyols include sucrose, glucose, mannose, mannitol, sorbitol, pentaerythritol, gluconic acid and glucoheptonic acid among the more common pure chemicals. Examples of polyol mixtures include the product produced by the hydrogenation of sugars and sold by the Atlas Chemical Industries under the trade name "Sutro," the mixed sugars and polysaccharides extracted from wood fibers by steam and water under high pressure and temperature and sold by Masonite Corporation under the tradename "Masonex," the by-product hydroxyacids extracted from wood fiber during hot alkaline refining, the mixture of sugars and polysaccharides extracted from wood chips during the selective prehydrolysis step in wood pulping procedures, the mixture of essentially monomeric wood sugars obtained by the further hydrolysis of the foregoing material and the carboxyl derivatives of wood sugars produced by reaction with sodium cyanide and hydrolysis.

Preparation of the iron hydroxide-polyol component of the invention may be accomplished in several ways well known to those skilled in the art. These include isolating freshly prepared ferrous hydroxide as a precipitate, washing it to remove electrolytes and then combining the purified ferrous hydroxide with a polyol compound in aqueous solution in various molecular proportions and at various concentrations. Alternatively the polyol can be dissolved in aqueous alkaline solution and the iron salt added in the same proportions or the iron salt solution can be admixed with alkaline aqueous solution and the polyol added. Advantageously it is prepared by reacting one part of soluble iron salt such as ferrous sulfate with from 0.5 to 5 parts polyol as herein described in aqueous solution at ambient temperature. The pH of the solution is then adjusted to from about 8 to 12 and preferably to about 9.5 to 10.5 using an alkali if necessary. The order of the addition is not particularly critical. The preferred iron salt is ferrous sulfate but other water-soluble iron salts can be used such as ferrous and ferric chloride, ferrous and ferric nitrate, ferrous and ferric acetate, etc. Any of the alkaline materials commonly used in dispersing iron hydroxides are also usable such as sodium hydroxide, potassium hydroxide, sodium carbonate, etc., but ammonia should preferably be avoided.

Formaldehyde, the third component of the grouting mixture should be present in an amount sufficient to insolubilize the polyphenolic material "in situ" with a small excess as a safety factor. This will require from about 1 to 10 percent based on the dry weight of the polyphenolic material with the preferred range for most operations lying within about 2 to 5 percent. Large excesses of formaldehyde should be avoided as they serve no useful purpose, are wasteful, unnecessarily dilute the gels as formed and frequently present a serious odor problem. Advantageously the formaldehyde solution is added to the iron hydroxide-polyol solution to form a setting agent which is then admixed with the alkaline polyphenolic solution at the time of injection into the formation being grouted. In another embodiment, the ferrous hydroxide-polyol complex may be dried, as by spray drying and blended with enough paraformaldehyde to provide the desired ratio of formaldehyde. This dry mixture can then be kept indefinitely and dissolved as needed in water to form a setting agent just prior to use. The liquid formaldehyde-iron hydroxide-polyol setting agent can also be kept reactive for several days if protected from air oxidation.

The sealing of basement and foundation walls against water seepage has been attempted heretofore by pumping a water slurry of Bentonite-type clays into the ground outside the wall. The purpose here was to fill the voids, pores and cracks in the wall with clay particles, allow the filled particles to hydrate and swell, and thereby stop the water seepage. However, in periods of dryness, the clay particles would dehydrate and shrink and, at times, shift or fall out of the voids in the wall leaving them open to seepage in the next wet period. This problem is overcome when the clay particles are admixed with the grouting compositions of the present invention, since thereby the clay particles are not only hydrated and swollen in the voids in the wall but also bonded to each other in a permanent gel structure as well as to the adjacent wall and surrounding soil to provide long-term sealing against water seepage.

By way of illustration only, the following examples describe the invention in more detail.

Example I

An autoclave equipped with mechanical agitator was charged with hogged Western hemlock bark, sodium hydroxide and water in a ratio corresponding to 100 parts dry bark, 9 parts sodium hydroxide and sufficient water to make a total charge of 530 parts. The charge was heated rapidly to 100° C. with stirring and held at this temperature for 30 minutes and discharged onto a 40 by 60 mesh screen and the solid residue pressed. The extract solution was clarified, concentrated to about 30 percent total solids by evaporation and spray dried. A dark colored, water soluble powder of alkaline polyphenolic material was obtained in a gross yield of 37 percent based on the weight of the original bark.

A 25 percent solution by weight of the polyphenolic bark extract was made up in water to serve as one of the reactants. The setting agent solution was made by dissolving $FeSO_4$—$7H_2O$ in water to make a 30 percent solution by weight and then mixing 200 ml. of this with 97 gm. of sucrose and 125 ml. of formaldehyde. 50 percent NaOH was then added to pH 10. Varying proportions of this setting agent solution were then added to 100 ml. of the polyphenolic bark extract solutions and gelation time and penetrometer strengths after varying times were determined.

The gel time was arbitrarily taken as the elapsed time (from the addition of the metal ion and formaldehyde) whereupon the solution solidified to a point where it no longer would adhere to a glass rod plunged into it (i.e., had a viscosity exceeding 10,000 poises). A commercially available automatic gelation timing instrument of the plunger type was also used, particularly when determining the longer tel times. Gel strengths were measured using a Proctor-type penetrometer as designated in ASTM Test C–403–61T for testing the setting of concrete mixtures.

In a separate experiment, immediately after mixing the grouting solution, it was forced into a quantity of 30–50 mesh sand and allowed to set. Penetrometer strengths were also determined on these mixtures after varying times. These results are given in Table I.

TABLE I.—NEAT GELS

| Percent iron | Gel time | Penetrometer strength, p.s.i. | | | | | |
|---|---|---|---|---|---|---|---|
| | | 0.25 hr. | 0.5 hr. | 1 hr. | 4 hr. | 24 hr. | 48 hr. |
| 0.43 | 33 min. | | | | 7 | 13 | 40 | 41 |
| 0.65 | 8 min., 45 sec. | 9 | 14 | 21 | 32 | 60 | 61 |
| 0.86 | 6 min., 30 sec. | 18 | 28 | 34 | 50 | 69 | 73 |
| 1.08 | 5 min., 30 sec. | 25 | 41 | 50 | 67 | 73 | 79 |
| Grouted Sand | | | | | | | |
| 0.43 | | | 170 | 300 | 430 | 900 | 580 |
| 0.65 | | 90 | 180 | 360 | 510 | 840 | 690 |
| 0.86 | | 180 | 400 | 470 | 540 | 1,040 | 970 |
| 1.08 | | 380 | 290 | 620 | 590 | 1,110 | 910 |

Example II

In order to show that various iron hydroxide-polyol complexes can be used successfully, setting agent solutions were prepared according to the procedure of Example I, using various polyols including sugars, their alcohol and acid derivatives and low molecular weight water-soluble polysaccharides. The ratio of ferrous (iron) ion to polyol compound was 1:2 based on the atomic weight of iron to polyol monomer molecular weight. A concentration of 1.08 percent iron based on the polyphenolic bark extract solids was used in each case, the bark extract being the same as used in Example I. Gel time and strength data were obtained at 70° F. as in Example I.

TABLE II.—NEAT GELS

| Polyol material | Gel time, mins. | Penetrometer strength, p.s.i. | | |
|---|---|---|---|---|
| | | 0.25 hr. | 1.0 hr. | 24 hrs |
| Sucrose | 5.5 | 25 | 50 | 73 |
| Glucose (Karo syrup) | 10.3 | 17 | 51 | 86 |
| Mannitol | 5.25 | 29 | 49 | 86 |
| Sutro-100 [a] | 7.4 | 30 | 50 | 89 |
| Pentaerithrytol | 20.0 | 0 | 28 | 88 |
| Gluconic acid | 2.25 | 23 | 43 | 104 |
| Crude polyhydroxy acid salts [b] | 11.4 | 19 | 46 | 73 |
| Wood sugar-polysaccharides [c] | 5.5 | 21 | 42 | 85 |
| Mixed wood sugars [d] | 8.0 | 26 | 46 | 84 |
| Grouted Sand | | | | |
| Sucrose | 380 | | 620 | 1,110 |
| Glucose (Karo syrup) | 280 | | 490 | 620 |
| Mannitol | 450 | | 680 | 950 |
| Sutro-100 [a] | 320 | | 730 | 1,110 |
| Pentaerythritol | 0 | | 350 | 1,280 |
| Gluconic acid | 870 | | 960 | 1,130 |
| Crude polyhydroxy acid salts [b] | 430 | | 730 | 1,390 |
| Wood sugar-polysaccharides [c] | 430 | | 650 | 1,040 |
| Mixed wood sugars [d] | 190 | | 420 | 910 |

[a] Sutro-100 is a commercial mixed polyol manufactured by Atlas Chemical Industries, Inc. and contains polyhydric alcohols from 3 to 6 carbons in chain length that result from hydrogenolysis of sugar.

[b] This material was prepared by alkaline refining of wood pulp which results in carbohydrate degradation. On a solids basis this product contained 27 percent sodium glucoisosaccharinate, 38 percent sodium salts of other polyhydroxy acids having 3 to 6 carbons in chain length, 17 percent sodium formate, 3.3 percent sodium acetate, 11.3 percent sodium salts of complex unidentified organic acids and 3.3 percent mineral constituents.

[c] This material was obtained by treating southern pine wood chips with water at 170° C. It contained 85 percent carbohydrates on a solids basis, of which 25 percent were composed of monomeric wood sugars, including arabinose, xylose, mannose, glucose and galactose, and 75 percent was composed of water soluble polysaccharides such as galactoglucomannan.

[d] This material was prepared by subjecting material "c" to mild mineral acid hydrolysis. On a solids basis it contained 8 percent arabinose, 15.2 percent xylose, 40.3 percent mannose, 15.9 percent glucose, 15.9 galactose and other minor constituents.

Example III

Setting agents containing iron hydroxide-polyol complexes are effective in grouting compositions containing a variety of polyphenol reagents obtained from vegetative raw materials, these polyphenols being broadly related to catechin or condensed tannins. Effective polyphenol materials may be obtained by selective extraction of bark with alkaline reagents as described in U.S. Pat. No. 2,782,241 or U.S. Pat. No. 2,819,295, or by treating commercial tannins such as quebracho wood extract or mangrove bark extract with alkaline reagents such as sodium hydroxide to produce alkaline water-soluble derivatives. The gel time and strength properties of grouts containing different polyphenols will vary considerably according to the nature, purity and concentration of each polyphenol as illustrated in Table III.

In this experiment, each polyphenol material was dissolved in water to produce a solution of the concentration indicated, solution pH being adjusted to 10.0. A supply of dry sucrose-iron hydroxide complex was prepared by dissolving 1.5 parts by weight of sucrose in 2 parts of water followed by addition of 0.6 part of 50 percent sodium hydroxide solution and then adding slowly a solution of 1 part of ferrous sulfate heptahydrate dissolved in 2 parts of water. This mixture was spray dried using 400° F. air to yield a dark green powder. A standard setting agent solution was prepared by dispersing 135 parts by weight of this material in 260 parts of water to which was added 54 parts of 37 percent aqueous formaldehyde.

Grout batches were prepared by mixing 24 parts by volume of the setting agent solution with 100 parts of the polyphenol solution. Gel time was measured at 70° F. as were gel strengths after 0.25, 1.0 and 24 hours.

polyol complexes when using various grout concentrations and operating temperatures.

A spray-dried polphenol material containing equal parts of the bark extract of Example 1 and quebracho wood extract, solubilized by dissolving in a solution containing 10 percent sodium hydroxide based on the dry weight of the quebracho extract, was used as a standard grout reagent. The reagent was dissolved in water to yield 10, 15, 20 and 25 percent solutions. The same dry sucrose-iron hydroxide complex agent as used in Example III was dispersed in water to yield various concentrations in the range of 10 to 40 percent while formaldehyde concentration was maintained in a range so that 3 to 5 percent formaldehyde was available in each grout composition based on the dry weight of the grout reagent. Grout compositions at each concentration are prepared in small batches for gel time and strength study and for pressure injection into standard soil samples. The amount of setting agent added expressed as percent iron, based on the grout reagent solids, to yield gel times in the range of 10 to 300 minutes at 70° C. is given in Table IV.

TABLE IV.—PERCENT IRON BASED ON GROUT REAGENT SOLIDS TO CONTROL GEL TIME AT VARIOUS GROUT REGENT CONCENTRATIONS

| | Gel time, minutes at 70° F. | | | | |
|---|---|---|---|---|---|
| | 10 | 50 | 100 | 200 | 300 |
| Grout reagent concentration, percent: | | | | | |
| 10 | 3.10 | 1.40 | 1.10 | 1.00 | 0.90 |
| 15 | 2.70 | 1.10 | 0.90 | 0.75 | 0.65 |
| 20 | 2.35 | 0.90 | 0.65 | 0.50 | 0.45 |
| 25 | 2.10 | 0.70 | 0.50 | 0.30 | 0.25 |

Gel time will also be affected by variations in the ambient temperature. Choosing a 15 percent grout reagent concentration, the control of gel time at temperatures in

TABLE III

| Polyphenol source | Solution concentration, percent | Iron, percent [1] | Gel time, minutes | Gel strength, p.s.i. | | |
|---|---|---|---|---|---|---|
| | | | | 0.25 hr. | 1 hr. | 24 hr. |
| (A) Hemlock bark | 25 | 2.59 | 2.5 | 45 | 63 | 83 |
| | 20 | 3.23 | 3.5 | 15 | 23 | 36 |
| (B) Southern pine bark | 25 | 2.59 | 4.0 | 61 | 72 | 86 |
| (C) Eucalyptus globulos bark | 25 | 2.59 | 4.0 | 24 | 27 | 37 |
| (D) Hemlock bark | 25 | [2] 1.30 | 1.0 | 45 | 62 | 79 |
| | 20 | 3.23 | 2.0 | 22 | 23 | 30 |
| (E) Quebracho wood | 25 | 2.59 | 35 | | 73 | 488 |
| | 20 | 2.23 | 26 | | 75 | 184 |
| (F) Mangrove bark | 25 | 3.59 | 23 | | 107 | 203 |
| (G) Mixture of equal weights of hemlock bark and Quebracho wood extracts | 25 | 2.59 | 7 | 77 | 128 | 260 |
| | 20 | 3.23 | 8 | 43 | 90 | 113 |
| | 15 | 4.31 | 6.5 | 12 | 38 | 56 |
| (H) Hemlock bark | 10 | 5.74 | 14 | | 11 | 18 |

[1] Percent iron based on dry polyphenol weight.
[2] In this case only 12 parts of the setting agent solution were added to 100 parts of the polyphenol solution.

In the foregoing table materials A, B and C were obtained as described in Example I but using the different raw materials indicated. Material D was obtained by extracting 100 parts of hemlock bark with a solution containing 10 parts of ammonia and 560 parts of water in an autoclave at 150° C. for 30 minutes. The product solution contained 26.4 parts of dissolved solids and was treated with 5.28 parts of sodium hydroxide. It was then concentrated under vacuum and spray dried.

Material E was prepared by dissolving 100 parts of commercial ordinary South American quebracho wood extract in water containing 10 parts of sodium hydroxide to yield solutions at the indicated concentration. Material F was prepared by dissolving 100 parts of commercial South African mangrove bark extract in water containing 10 parts of sodium hydroxide.

Material H was obtained by extracting 100 parts of dry hemlock bark with a solution containing 30 parts of sodium hydroxide and 560 parts of water in an autoclave at 170° C. for 30 minutes. The solution was then concentrated and spray dried to yield 85 parts of product.

Example IV

This example illustrates the wide range of control over gel time that can be achieved by use of iron hydroxidethe range of 40° to 90° F. by varying the amount of selling agent added to the grout composition, is illustrated in Table V.

TABLE V.—PERCENT IRON BASED ON GROUT REAGENT SOLIDS TO CONTROL GEL TIME AT VARIOUS TEMPERATURES USING 15 PERCENT GROUT REAGENT CONCENTRATION

| | Gel time, minutes | | | | |
|---|---|---|---|---|---|
| | 10 | 50 | 100 | 200 | 300 |
| Temperature, ° F.: | | | | | |
| 40 | 5.80 | 2.00 | 1.20 | 0.90 | 0.80 |
| 70 | 2.70 | 1.10 | 0.90 | 0.75 | 0.65 |
| 90 | 1.80 | 0.80 | 0.60 | 0.50 | 0.40 |

The strength properties of grout compositions and the rate of strength development will be dependent upon polyphenol and setting agent concentration factors and temperature. Ultimate strength properties are dependent principally on the concentration of the polyphenol reagent which continues to react with formaldehyde to form structural polymers over a period of several weeks. Some of the strength properties of the above grout compositions as observed in neat gel samples and in grouted sand samples at 70° F. are shown in Table VI.

TABLE VI

| Grout reagent concentration, percent | Iron, percent | Gel time, minutes | Pentrometer strength, p.s.i. (Neat Gels) | | | |
|---|---|---|---|---|---|---|
| | | | 1 hr. | 4 hr. | 48 hr. | 30 days |
| 10 | 4.8 | 7 | 9 | 17 | 23 | 37 |
| 15 | 3.8 | 8 | 37 | 44 | 69 | 86 |
| 20 | 2.7 | 8 | 81 | 106 | 145 | 234 |
| 25 | 2.1 | 10 | 116 | 150 | 234 | 468 |
| Grouted 30 to 50 Mesh Sand | | | | | | |
| 10 | 4.8 | 7 | 750 | 800 | 950 | 1,200 |
| 15 | 3.6 | 8 | 960 | 1,370 | 1,780 | 1,800 |
| 20 | 2.7 | 8 | 1,270 | 1,870 | 2,000 | 2,740 |
| 25 | 2.1 | 10 | 1,730 | 2,460 | 2,720 | 4,520 |

Example V

This example illustrates a grouting composition containing clay for use in sealing basement or foundation walls against water seepage.

To 20 parts of a 10% by weight aqueous solution of the polyphenolic bark extract described in Example 1 was added 3 parts by volume of bentonite clay, having a particle size of 20 to 30 mesh screen. Then, a sufficient amount of iron-sugar complex catalyst solution was added to provide 0.43% iron based on the dry weight of the bark extract. The catalyst solution was prepared by mixing 200 ml. of a 37% by weight aqueous solution of $FeSO_4 7H_2O$ with 97 grams of sucrose and 125 ml. of 37% aqueous formaldehyde solution and sufficient NaOH to establish the pH at 10.

The resulting grouting composition gelled in about ½ hour and could be delivered for sealing against water seepage by injection into the ground 10 inches from a basement wall, at 30 inch spacings down to the footing for the wall.

The gel time could be varied and controlled by changing the relative proportions between the polyphenolic bark extract and catalyst solutions.

EXAMPLE VI

To 20 parts of the polyphenolic bark extract solution described in the preceding example was added 3 parts by volume of bentonite clay. After dispersing the clay in the solution by agitation, 2 parts by volume of the catalyst solution described in the preceding example was added to give a gel time of about ½ hour, which could be varied by adding a greater or lesser proportion of the catalyst solution.

This composition also was suitable for saturation of basement or foundation walls and the surrounding soil to stop water seepage through the walls.

We claim:

1. In the process for producing a grouted structure wherein an alkaline aqueous gel-forming composition is distributed in a mass of solid particulate material, and wherein said gel-forming composition is prepared by forming an admixture of (a) vegetative polyphenolic material of the group consisting of catechin type and condensed tannins and alkaline extracts of coniferous tree bark, (b) from about 1 to 10 weight percent of formaldehyde based on the dry weight of the polyphenolic material, and (c) a water-soluble iron salt to implement and control the gel-forming reaction, the improvement which comprises reacting said water-soluble iron salt in aqueous solution with a polyol of the group consisting of monomeric sugars, low-molecular weight sugar polymers, derivatives thereof selected from the group consisting of sugar alcohols, sugar acids and sugar glycosides and mixtures of the same to form an iron hydroxide polyol complex dispersible in aqueous alkaline solutions, and adding about 0.1 to 10% based on the dry weight of the polyphenolic material of the iron hydroxide-polyol complex (calculated as iron) to (a) and (b) to form said admixture.

2. The process of claim 1 in which the vegetative polyphenolic material is obtained by digesting the bark of coniferous trees of the group consisting of Western hemlock, Douglas fir, Sitka spruce, white fir and southern yellow pine in aqueous alkaline solution and recovering the thereby extracted vegetative polyphenolic material from said aqueous alkaline digesting solution.

3. The process of claim 1 in which the vegetative polyphenolic material is a catechin type or condensed tannin obtained by digesting the wood and bark of trees of the group consisting of quebracho, mangrove, mimosa and wattle in aqueous solution and recovering the thereby extracted tannin from said digesting solution.

4. The process of claim 1 in which the vegetative polyphenolic material is a mixture of an aqeous alkaline extract of coniferous tree bark and a catechin type and condensed tannin.

5. The process of claim 1 in which the ironhydroxide-polyol complex (calculated as iron) is used in the amount of 0.5 to 3.0 percent based on the dry weight of the polyphenolic material and the formaldehyde is used in the amount of from about 2 to 5 percent based on the dry weight of the polyphenolic material.

6. The process of claim 1 which includes the step of adding particles of clay to said admixture prior to distribution thereof into said mass of solid particulate material, the weight ratio of said vegetative polyphenolic material to said added clay particles being from about 1:5 to 5:1.

References Cited

UNITED STATES PATENTS

| 2,227,653 | 1/1941 | Langer | 61—36 |
| 3,391,542 | 7/1968 | Herrick et al. | 260—38 |
| 3,422,068 | 1/1969 | Kreibich et al. | 260—17.2 |

OTHER REFERENCES

Chem. abst., vol. 66: 39027b, Davis et al., "Prediction . . . Sugars."

Chem. abst., vol. 64; 14966f, Leake et al., "Polarography of Catechol."

WILLIAM H. SHORT, Primary Examiner

E. WOODBERRY, Assistant Examiner

U.S. Cl. X.R.

52—744; 61—36; 260—38

PO-1050
(5/69)

UNITED STATES PATENT OFFICE
CERTIFICATE OF CORRECTION

Patent No. 3,530,081   Dated September 22, 1970

Inventor(s) FRANKLIN W. HERRICK, LLOYD E. VAN BLARICOM, ROBERT L. STRACHILA and GEORGE E. DURKEE It is certified that error appears in the above-identified patent and that said Letters Patent are hereby corrected as shown below:

Column 2, line 8, "aqqueous" should read -- aqueous --

Column 7, Table III, 8th line under "Iron percent" column, "2.23" should read -- 3.23 --

Column 7, Table III, 9th line under "Iron percent" column, "3.59" should read -- 2.59 --

Column 8, line 3, "polphenol" should read -- polyphenol --

Column 9, line 4, Table VI, "Pentrometer" should read -- Penetrometer --

SIGNED AND
SEALED
DEC 8 - 1970

(SEAL)
Attest:

Edward M. Fletcher, Jr.
Attesting Officer

WILLIAM E. SCHUYLER, JR.
Commissioner of Patents